United States Patent
Zeng

(10) Patent No.: US 10,891,500 B2
(45) Date of Patent: Jan. 12, 2021

(54) METHOD AND APPARATUS FOR ACQUIRING TRAFFIC SIGN INFORMATION

(71) Applicant: TENCENT TECHNOLOGY (SHENZHEN) COMPANY LIMITED, Guangdong (CN)

(72) Inventor: Chao Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 281 days.

(21) Appl. No.: 16/016,981

(22) Filed: Jun. 25, 2018

(65) Prior Publication Data

US 2018/0307924 A1    Oct. 25, 2018

Related U.S. Application Data

(63) Continuation of application No. PCT/CN2017/100358, filed on Sep. 4, 2017.

(30) Foreign Application Priority Data

Sep. 13, 2016   (CN) .......................... 2016 1 0822521

(51) Int. Cl.
*G06K 9/00* (2006.01)
*G06K 9/48* (2006.01)
(Continued)

(52) U.S. Cl.
CPC ....... *G06K 9/00818* (2013.01); *G06K 9/2018* (2013.01); *G06K 9/3275* (2013.01);
(Continued)

(58) Field of Classification Search
None
See application file for complete search history.

(56) References Cited

U.S. PATENT DOCUMENTS 9,056,395 B1 *  6/2015  Ferguson ............. G05D 1/0251
9,193,355 B2    11/2015  Ferguson et al.
(Continued)

FOREIGN PATENT DOCUMENTS

CN       102779280 A    11/2012
CN       104280036 A     1/2015
(Continued)

OTHER PUBLICATIONS

Communication dated Oct. 8, 2018, from the State Intellectual Property Office of People's Republic of China in counterpart Application No. 201610822521.4.

(Continued)

*Primary Examiner* — Bernard Krasnic
(74) *Attorney, Agent, or Firm* — Sughrue Mion, PLLC

(57) ABSTRACT

A method for acquiring traffic sign information includes acquiring an image of a scene comprising a traffic sign, the image being obtained by photographing the scene, using a photographing apparatus, acquiring first laser data of the scene, the first laser data being obtained by performing laser scanning on the scene, and the first laser data being of a plurality of first laser points, performing spatial clustering on the plurality of first laser points to obtain candidate point sets, acquiring a spatial distribution feature of respective laser points in each of the candidate point sets, determining at least one point set corresponding to the traffic sign in the candidate point sets, based on the spatial distribution feature, extracting image data of the traffic sign, from the image, using the at least one point set corresponding to the traffic sign, and extracting sign information of the traffic sign, from the image data.

15 Claims, 11 Drawing Sheets

(51) Int. Cl.
    *G06K 9/20*     (2006.01)
    *G06T 7/521*     (2017.01)
    *G06K 9/32*     (2006.01)
    *G06K 9/38*     (2006.01)
    *G06K 9/46*     (2006.01)

(52) U.S. Cl.
    CPC ............... *G06K 9/38* (2013.01); *G06K 9/46* (2013.01); *G06K 9/48* (2013.01); *G06T 7/521* (2017.01); *G06K 2009/487* (2013.01); *G06T 2207/10028* (2013.01); *G06T 2207/30252* (2013.01)

(56) References Cited

U.S. PATENT DOCUMENTS

| | | | | |
|---|---|---|---|---|
| 9,368,936 | B1* | 6/2016 | Lenius | G01S 17/32 |
| 9,383,753 | B1* | 7/2016 | Templeton | G01S 17/86 |
| 2015/0220795 | A1* | 8/2015 | Fischer | B60R 1/00 |
| | | | | 348/148 |
| 2018/0060986 | A1* | 3/2018 | Suzuki | G08G 1/0969 |
| 2018/0120857 | A1* | 5/2018 | Kappauf | G01S 17/86 |
| 2018/0211119 | A1* | 7/2018 | Liu | B60W 10/20 |
| 2018/0225515 | A1* | 8/2018 | Jiang | G06K 9/6211 |

FOREIGN PATENT DOCUMENTS

| | | | |
|---|---|---|---|
| CN | 104866840 A | 8/2015 | |
| CN | 105678318 A | 6/2016 | |
| CN | 106560835 A | 4/2017 | |
| WO | WO-2016132587 A1 * | 8/2016 | ......... G08G 1/09623 |

OTHER PUBLICATIONS

International Search Report for PCT/CN2017/100358 dated Dec. 5, 2017 [PCT/ISA/210].

Communication dated Dec. 14, 2018 from the State Intellectual Property Office of the P.R.C. in application No. 201610822521.4.

* cited by examiner

METHOD AND APPARATUS FOR ACQUIRING TRAFFIC SIGN INFORMATION

CROSS-REFERENCE TO RELATED APPLICATIONS

This application is a continuation of International Patent Application No. PCT/CN2017/100358 filed on Sep. 4, 2017, which claims priority from Chinese Patent Application No. 201610822521.4, entitled "METHOD AND APPARATUS FOR ACQUIRING TRAFFIC SIGN INFORMATION," and filed in the Chinese Patent Office on Sep. 13, 2016, which are incorporated herein by reference in their entireties.

BACKGROUND

1. Field

Methods and apparatuses consistent with embodiments relate to the field of surveying and mapping technologies, and in particular, to a method and an apparatus for acquiring traffic sign information.

2. Description of Related Art

With development of technologies, an automated driving technology, as a typical mode of artificial intelligence, attracts increasing attention. One of key technologies for implementing the automated driving technology is a high-precision map. Sign information of a traffic sign is one of important components in the high-precision map. Currently, acquiring the sign information of the traffic sign usually includes using an image capturing device to perform image capturing on an area including the traffic sign, and performing image recognition on a captured image to detect the traffic sign therein.

SUMMARY

According to embodiments, there is provided a method for acquiring traffic sign information, the method being performed by a data processing device, and the method including acquiring an image of a scene including a traffic sign, the image being obtained by photographing the scene, using a photographing apparatus, and acquiring first laser data of the scene, the first laser data being obtained by performing laser scanning on the scene, and the first laser data being of a plurality of first laser points. The method further includes performing spatial clustering on the plurality of first laser points to obtain candidate point sets, acquiring a spatial distribution feature of respective laser points in each of the candidate point sets, determining at least one point set corresponding to the traffic sign in the candidate point sets, based on the spatial distribution feature, extracting image data of the traffic sign, from the image, using the at least one point set corresponding to the traffic sign, and extracting sign information of the traffic sign, from the image data.

According to embodiments, there is provided an apparatus for acquiring traffic sign information, the apparatus including at least one memory configured to store computer program code; and at least one processor configured to access the at least one memory and operate according to the computer program code. The computer program code includes scanning code configured to cause the at least one processor to acquire an image of a scene including a traffic sign, the image being obtained by photographing the scene, using a photographing apparatus, and acquire first laser data of the scene, the first laser data being obtained by performing laser scanning on the scene, and the first laser data being of a plurality of first laser points. The computer program code further includes clustering code configured to cause the at least one processor to perform spatial clustering on the plurality of first laser points to obtain candidate point sets, and determining code configured to cause the at least one processor to acquire a spatial distribution feature of respective laser points in each of the candidate point sets, and determine at least one point set corresponding to the traffic sign in the candidate point sets, based on the spatial distribution feature. The computer program code further includes acquiring code configured to cause the at least one processor to extract image data of the traffic sign, from the image, using the at least one point set corresponding to the traffic sign, and extract sign information of the traffic sign, from the image data.

According to embodiments, there is provided a non-transitory computer-readable storage medium storing instructions that cause a processor to acquire an image of a scene including a traffic sign, the image being obtained by photographing the scene, using a photographing apparatus, and acquire first laser data of the scene, the first laser data being obtained by performing laser scanning on the scene, and the first laser data being of a plurality of first laser points. The instructions further cause the processor to perform spatial clustering on the plurality of first laser points to obtain candidate point sets, acquire a spatial distribution feature of respective laser points in each of the candidate point sets, determine at least one point set corresponding to the traffic sign in the candidate point sets, based on the spatial distribution feature, extract image data of the traffic sign, from the image, using the at least one point set corresponding to the traffic sign, and extract sign information of the traffic sign, from the image data.

DESCRIPTION OF EMBODIMENTS

To make objectives, technical solutions, and advantages of this application clearer, the following further describes implementations of this application in detail with reference to the accompanying drawings.

A high-precision map is an important auxiliary of an automated driving technology. A traveling direction and a road condition in front of an automobile can be informed by using the high-precision map. A traffic sign is an important component of the high-precision map. To acquire sign information of the traffic sign, an embodiment of this application provides a method for acquiring traffic sign information, and the method may be implemented by an information processing system.

Figure 4:
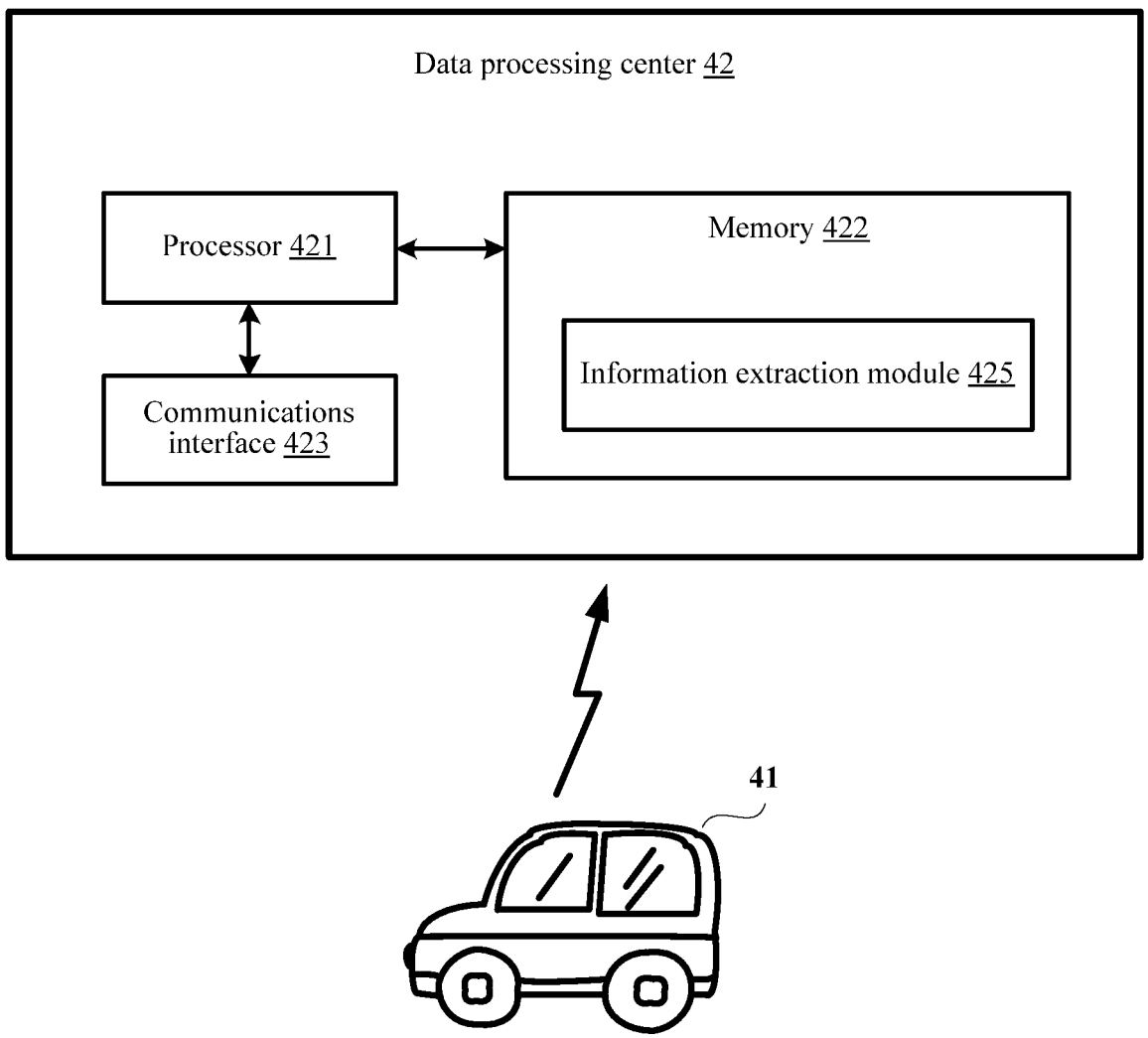
FIG. 4 is a schematic diagram of an information processing system according to embodiments.

FIG. 4 is a schematic diagram of an information processing system 40 according to embodiments. As shown in FIG. 4, the information processing system 40 may include a mobile capturing device 41 and a data processing center 42.

The mobile capturing device 41 is a movable device configured to capture the traffic sign information. In some examples, the mobile capturing device 41 may move by being loaded onto a movable person or an object (for example, a vehicle), and for example, may be a handheld device and an on-board equipment. The mobile capturing device 41 may include a laser scanning system and a video imaging system.

The laser scanning system is configured to perform laser scanning on a scene, to obtain laser data (i.e., first laser data) of the scene. In some examples, the laser scanning system may include a laser emitting apparatus and a receiving and detection apparatus. The laser emitting apparatus is configured to emit a laser to the scene; and the receiving and detection apparatus is configured to detect a laser reflected from the scene. In some examples, the laser scanning system may include a two-dimensional or three-dimensional laser scanning device configured to perform laser scanning on the scene, to obtain laser data. The laser data may be embodied as a set of data of a plurality of laser points (i.e., a plurality of first laser points), a laser point cloud, or other forms. The laser point cloud is a set of a large number of laser data points obtained by scanning by using a laser. The laser data may include a position (a two-dimensional or three-dimensional coordinate) of each laser point, and a reflection characteristic value.

The video imaging system includes a photographing apparatus configured to photograph the scene to obtain an image of the scene. The photographing apparatus may include a lens and an image sensor such as CCD and CMOS. FIG. 4 shows only the mobile capturing device 41 as an example to illustrate the implementations of the technical solutions of this application. In some embodiments, the information processing system 40 may include a plurality of mobile capturing devices 41.

The data processing center 42 may include one or more data processing devices. Therefore, the data processing center 42 may include one or more processors 421. The data processing center 42 may further include a memory 422 and a communications interface 423. The data processing center 42 may establish a connection with the mobile capturing device 41 by using the communications interface 423, to communicate with the mobile capturing device 41. The connection may be a wired connection (for example, a connection established by using a cable or a socket), may alternatively be a wireless connection (a connection such as Wi-Fi, cellular mobile communications, radio frequency, Bluetooth, or infrared), may be a direct connection, may alternatively be a connection established by using a network, and so on. The data processing center 42 may acquire, by using the communications interface 423, an image of a scene and laser data captured by the mobile capturing device 41, and process the data to extract information of a traffic sign in the scene. In some embodiments, the memory 422 may store an information extraction module 425. The information extraction module 425 may be stored in the memory 422 in a form of a computer readable instruction, and may be executed by the processors 421, to implement the method for acquiring traffic sign information in the embodiment of this application.

Figure 5:
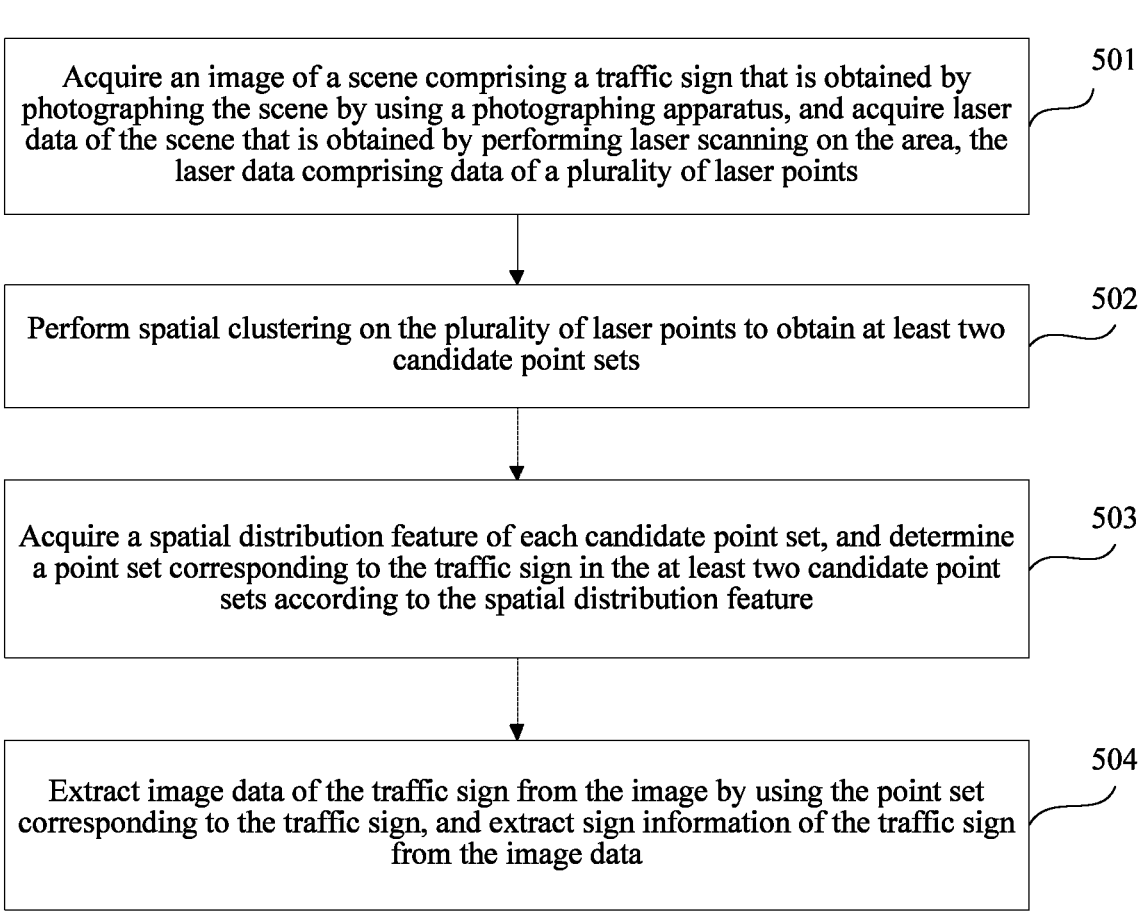
FIG. 5 is a flowchart of a method for acquiring traffic sign information according to embodiments.

FIG. 5 is a flowchart of a method 50 for acquiring traffic sign information according to embodiments. The method 50 may be performed by the data processing center 42. As shown in FIG. 5, the method 50 may include the following steps:

Step 501: acquire an image of a scene comprising a traffic sign that is obtained by photographing the scene by using a photographing apparatus, and acquire laser data of the scene that is obtained by performing laser scanning on the area, the laser data comprising data of a plurality of laser points.

Step 502: perform spatial clustering on the laser points in the laser data to obtain at least two candidate point sets.

Herein, spatial clustering means grouping the laser points according to spatial positions according to position data of each laser point in the laser data, and each group is as a candidate point set. For example, laser points relatively close to each other are grouped as a group, and laser points relatively far from each other are divided into different groups. In this way, laser points in each candidate point set are possibly formed by lasers reflected from a surface of a same object. Each candidate point set may be embodied as data set of a group of points, and may alternatively be embodied as a point cloud.

Step 503: acquire a spatial distribution feature of each candidate point set, and determining a point set corresponding to the traffic sign in the at least two candidate point sets according to the spatial distribution feature.

Step 504: extract image data of the traffic sign from the image by using the point set corresponding to the traffic sign, and extract sign information of the traffic sign from the image data.

Herein, a scene including a traffic sign refers to a physical environment (for example, two sides of a road, or above a road) where a traffic sign is disposed, and is also referred to as an area including a traffic sign.

In this way, by using a feature that a traffic sign has high reflectivity to a laser, a traffic sign in a scene image is positioned by using laser data of the traffic sign, and then traffic sign information is extracted from only a position where the traffic sign in the scene image is located, thereby improving recognition accuracy of the traffic sign.

In some embodiments, the acquiring laser data of the scene may include: acquiring data (i.e., second laser data) of a plurality of second laser points that is obtained by laser scanning, and a reflection characteristic value of each second laser point; and forming (i.e., generating) the laser data by using a plurality of laser points whose reflection characteristic values are greater than or equal to a preset threshold and that are selected from the second laser points. In this way, by using high reflection of a traffic sign, points of a relatively good reflection characteristic are selected from the obtained laser points to form laser data, and used for subsequent calculation, thereby significantly reducing a data volume of the laser data, and improving the calculation efficiency. The reflection characteristic value may be a reflection intensity value, a reflectivity value, and so on.

In some embodiments, the performing spatial clustering on the plurality of laser points to obtain at least two candidate point sets may include grouping the plurality of laser points in the laser data by using a preset distance threshold to form the at least two candidate point sets, a spatial distance between laser points in different candidate point sets being greater than the distance threshold. The spatial distance between the laser points may be obtained by using a Euclidean distance or a similar algorithm. In this way, by using clustering, laser points may be divided as a plurality of candidate point sets, and each candidate point set may be considered as a set of laser points from an object. Subsequently, only each candidate point set may be processed to efficiently find out a point set corresponding to a traffic sign.

In some embodiments, the acquiring a spatial distribution feature of each candidate point set, and determining a point set corresponding to the traffic sign in the at least two candidate point sets according to the spatial distribution feature may include: acquiring spatial distribution feature values of the laser points in each of the at least two candidate point sets in at least two dimensions; and selecting at least one candidate point set from the at least two candidate point sets, as the point set corresponding to the traffic sign, by using at least two preset spatial distribution feature thresholds and the spatial distribution feature values of each candidate point set. The foregoing spatial distribution feature value may be selected from a distribution feature value in length, a distribution feature value in width, a distribution feature value in height, a linear distribution feature value, an areal distribution feature value, a solid distribution feature value, a curvature, and a fitted plane feature value. The foregoing preset spatial distribution feature thresholds may be determined according to a size range and a shape feature of the traffic sign. In this way, the point set corresponding to the traffic sign may be determined in the plurality of candidate point sets.

In some embodiments, the extracting image data of the traffic sign from the image by using the point set corresponding to the traffic sign may include: determining a position of the image data of the traffic sign in the image of the scene according to a preset parameter and a position of the point set corresponding to the traffic sign in a laser point set of the scene; and extracting the image data of the traffic sign from the position in the image. A position of a laser scanning apparatus and a position and a posture of the photographing apparatus are relatively fixed, a conversion relationship between coordinate systems of data obtained by them is referred to as a conversion parameter (also referred to as an exterior orientation element), and the laser point set may be accurately projected to an image by using the conversion parameter (or a parameter matrix). In some examples, when the position of the image data of the traffic sign in the image of the scene is determined according to the point cloud of the traffic sign, the point set of the traffic sign may be projected to the image of the scene by using the conversion parameter, and a position in the image of the scene where the point set of the traffic sign is projected may be determined as a position of the traffic sign in the image of the scene, that is, the image data of the traffic sign may be acquired from the position. The conversion parameter may include a spatial position of a main beam, a posture parameter, and so on, when laser scanning is performed.

In some embodiments, the extracting sign information of the traffic sign from the image data may include performing image recognition on the image data of the traffic sign to obtain the sign information of the traffic sign.

In some embodiments, before the performing image recognition on the image data of the traffic sign, the image data of the traffic sign may further be corrected by using the point set corresponding to the traffic sign, to eliminate image obliquity of the image data. Then, image recognition is performed on the corrected image data of the traffic sign. By eliminating the image obliquity of the image data, recognition accuracy of the traffic sign may be improved.

In some embodiments, the correcting the image data of the traffic sign by using the point set corresponding to the traffic sign may include: determining a fitted plane equation of the traffic sign by using the point set corresponding to the traffic sign; and correcting the image data of the traffic sign by using the fitted plane equation, to eliminate the imaging inclined angle of the image data. By this correcting, the obtained image data of the traffic sign is relatively similar to an image photographed from a facade of the traffic sign, thereby improving recognition accuracy of the traffic sign.

Referring again to FIG. 4, in some embodiments of this application, the data processing center 42 may be disposed in a physical device whose position is different from that of the mobile capturing device 41. For example, the data processing center 42 may be implemented by one or more computing device of fixed positions.

In some other embodiments of this application, the data processing center 42 may alternatively be implemented by using a device or a set of devices that are disposed at a same physical position with the mobile capturing device 41. For example, the method for acquiring sign information may be applied to a terminal.

Figure 1A:
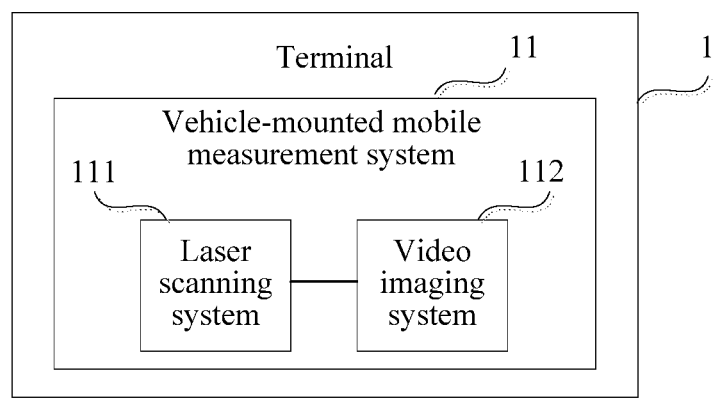
FIG. 1A is a schematic diagram of a vehicle-mounted mobile measurement system according to embodiments.

FIG. 1A is a schematic diagram of a vehicle-mounted mobile measurement system 11 according to embodiments. As shown in FIG. 1A, the terminal 1 may include the vehicle-mounted mobile measurement system 11, and the terminal may perform related operations by taking an automobile as a carrier.

The vehicle-mounted mobile measurement system 11 may include a laser scanning system 111 and a video imaging system 112, and the laser scanning system 111 is connected to the video imaging system 112. The laser scanning system 111 may provide an operation of laser scanning processing, to enable the terminal to perform laser scanning processing on an area including a traffic sign, to acquire a plurality of laser points (also referred to as laser scanning points) of the traffic sign. The video imaging system 112 may perform, when the laser scanning system 111 performs laser scanning processing, imaging processing on an area on which laser scanning processing is performed, to obtain an image of the area including a traffic sign.

In addition, the terminal 1 may not only include a vehicle-mounted mobile measurement system, but also may include another system and equipment such as a processor, which is not specifically limited in the embodiment of this application. The processor may be connected to the vehicle-mounted mobile measurement system, and the processor may be an all-purpose central processing unit (CPU), a microprocessor, an application-specific integrated circuit (ASIC), or one or more integrated circuits configured to control execution of a program of the solutions of this application. The processor may perform related processing on the plurality of laser points of the traffic sign acquired by laser scanning processing of the terminal, and the image of the area including a traffic sign acquired by using the video imaging system.

In some embodiments, similarly, the vehicle-mounted mobile measurement system may not only include a laser scanning system and a video imaging system, but also may include another system such as an integrated navigation system. The integrated navigation system may be respectively connected to the laser scanning system and the video imaging system, and add sign information of the traffic sign into a high-precision map after acquiring the sign information of the traffic sign, thereby implementing automated driving of an automobile, which is not specifically limited in the embodiment of this application similarly.

The terminal may perform laser scanning processing on the area including a traffic sign by using the foregoing laser scanning system, and may alternatively use another method, which is not specifically limited in the embodiment of this application. Similarly, the terminal may obtain the image of the area including a traffic sign by using the foregoing video imaging system, and may alternatively obtain the image of the area including a traffic sign by using another method, which is not specifically limited in the embodiment of this application similarly.

In the embodiment of this application, the terminal may acquire the sign information of the traffic sign by using the foregoing vehicle-mounted mobile measurement system, to improve accuracy, efficiency and robustness of acquiring the sign information.

Figure 1B:
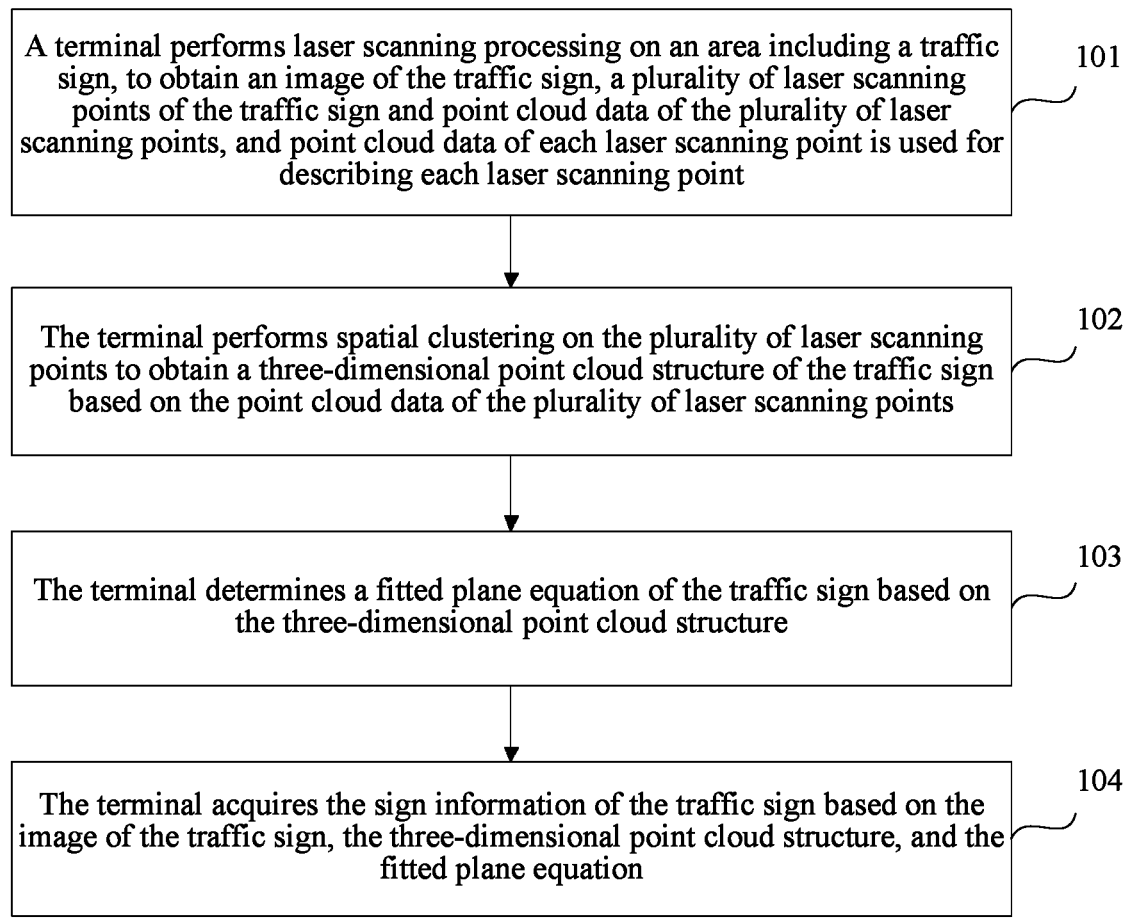
FIG. 1B is a flowchart of a method for acquiring sign information according to embodiments.

FIG. 1B is a flowchart of a method for acquiring sign information according to embodiments. Referring to FIG. 1B, the method includes:

Step 101: a terminal performs laser scanning processing on an area including a traffic sign, to obtain an image of the traffic sign, a plurality of laser points of the traffic sign and point cloud data of the plurality of laser points, and point cloud data of each laser point is used for describing each laser point.

Because the traffic sign has relatively strong reflection intensity to light, and has an apparent difference from another object in a reflectivity value after laser scanning processing, the feature of the traffic sign may be used to perform laser scanning processing on an area including a traffic sign, to obtain an image of the traffic sign, a plurality of laser points of the traffic sign and point cloud data of the plurality of laser points.

A terminal may perform laser scanning processing on an area including a traffic sign, to obtain an image of the traffic sign, a plurality of area points and point cloud data of the plurality of area points, and point cloud data of each area point includes a reflectivity value of each area point; select a plurality of area points whose reflectivity values are greater than or equal to a reflectivity threshold from the plurality of area points; determine the plurality of selected area points as a plurality of laser points of the traffic sign; and determine point cloud data of the plurality of selected area points as point cloud data of the plurality of laser points.

The reflectivity threshold refers to a standard of selecting laser points from a plurality of area points, and the reflectivity threshold may be set in advance. For example, the reflectivity threshold may be 60%, 70%, and so on, which is not specifically limited in the embodiment of this application.

In addition, the point cloud data may not only include a reflectivity value of each area point, but also may include another parameter. For example, the point cloud data may further include a three-dimensional coordinate of each area point in a specified three-dimensional coordinate system, which is not specifically limited in the embodiment of this application.

In the embodiment of this application, the area on which laser scanning processing is performed by the terminal possibly includes a traffic sign, and also possibly includes a plurality of traffic signs. When the area includes a plurality of traffic signs, a method for acquiring sign information of the plurality of traffic signs is the same as a method for acquiring sign information of a traffic sign, which is not specifically limited in the embodiment of this application.

In the embodiment of this application, because the number of area points obtained after laser scanning processing is performed on an area including the traffic sign is relatively large, and a proportion of the traffic sign in the area is quite small, the number of laser points determined in the large number of area points is less by using a feature that the traffic sign has relatively strong reflection to light and a reflectivity threshold, thereby reducing a calculated amount, and improving efficiency of subsequently acquiring the sign information of the traffic sign by using the terminal. Moreover, because a laser is an active light source, when a laser scanning processing is performed on an area including the traffic sign, the illumination impact may be avoided, thereby improving accuracy of subsequently acquiring the sign information.

Based on the foregoing descriptions, the terminal 1 of FIG. 1A may include the vehicle-mounted mobile measurement system 11, and the vehicle-mounted mobile measurement system 11 may further include the laser scanning system 111 and the video imaging system 112. Therefore, the terminal 1 may perform laser scanning processing on the area including the traffic sign by using the laser scanning system 111, and generate an image of the traffic sign by using the video imaging system 112 when the terminal performs laser scanning processing.

Step 102: the terminal performs spatial clustering on the plurality of laser points to obtain a three-dimensional point cloud structure of the traffic sign based on the point cloud data of the plurality of laser points.

The terminal determines the number of the plurality of laser points as m, 0 being assigned to each laser point in the m laser points; sequentially traverses each laser point; establishes an initial three-dimensional point cloud structure when determining that 0 is assigned to a laser point; adds the laser point into a component constituting the initial three-dimensional point cloud structure; assigns 1 to the laser point; determines the number of laser points constituting the current initial three-dimensional point cloud structure is n; determines whether the number n of the laser points included in the initial three-dimensional point cloud structure after increasing 1 is less than or equal to the number of the m laser points; when the number n of the laser points included in the initial three-dimensional point cloud structure after increasing 1 is less than or equal to the number of the m laser points, makes a (n−1)th laser point constituting the initial point cloud structure as a reference point, determines a laser point in the m laser points whose distance from the (n−1)th laser point is less than a distance threshold, and adds the determined laser point into the initial three-dimensional point cloud structure; performs repeated operations starting from the operation of determining whether the number n of the laser points included in the initial three-dimensional point cloud structure after increasing 1 is less than or equal to the number of the m laser points, until the number n of the laser points included in the initial three-dimensional point cloud structure after increasing 1 is greater than the number of the m laser points; and determines a final three-dimensional point cloud structure.

The distance threshold refers to a standard of selecting points constituting the initial three-dimensional point cloud structure, and the distance threshold may be set in advance. For example, the distance threshold may be 10 cm, 20 cm, and so on, which is not specifically limited in the embodiment of this application.

In addition, a three-dimensional point cloud structure is a three-dimensional structure of a traffic sign that is constituted by a plurality of laser points, and the three-dimensional point cloud structure may carry point cloud data of each laser point.

The foregoing operation of performing spatial clustering on the plurality of laser points is described by using a Euclidean distance clustering method as an example, which does not constitute a limit on the embodiment of this application. In the embodiment of this application, the terminal may perform operations such as splitting and extraction on the plurality of laser points by using a Euclidean distance clustering method, and may alternatively use another method, which is not specifically limited in the embodiment of this application.

Step 103: the terminal determines a fitted plane equation of the traffic sign based on the three-dimensional point cloud structure.

The terminal performs a principal component analysis on the three-dimensional point cloud structure to obtain each spatial feature value of the three-dimensional point cloud structure; determines a feature vector of a smallest spatial feature value in each spatial feature value of the three-dimensional point cloud structure; determines a three-dimensional coordinate of a centroid of the three-dimensional point cloud structure in a specified three-dimensional coordinate system; and determines a fitted plane equation of the traffic sign based on the feature vector and the three-dimensional coordinate of the centroid of the three-dimensional point cloud structure in the specified three-dimensional coordinate system.

The terminal performs a principal component analysis on the three-dimensional point cloud structure, that is, the terminal may extract a laser point that can embody a feature of the three-dimensional point cloud structure from the three-dimensional point cloud structure. The terminal further obtains a projection matrix by processing the laser point, and performs dimension reducing on the projection matrix, thereby obtaining each spatial feature value. Each spatial feature value may include a first feature value, a second feature value and a third feature value, which is not specifically limited in the embodiment of this application.

The terminal may determine a feature vector of a smallest spatial feature value in each spatial feature value of the three-dimensional point cloud structure by using a principal component analysis method. In actual application, another method may also be used to determine, which is not specifically limited in the embodiment of this application.

An operation that the terminal obtains each spatial feature value by analyzing the three-dimensional point cloud structure by using a principal component analysis method and an operation that the terminal obtains a feature vector of a smallest spatial feature value by analyzing the smallest spatial feature value in each spatial feature value of the three-dimensional point cloud structure by using a principal component analysis method, simplify a calculation process, and improve the operating efficiency of the terminal, i.e., the terminal acquires each spatial feature value and a feature vector of the smallest spatial feature value.

In addition, the terminal may determine the centroid of the three-dimensional point cloud structure according to a shape of the three-dimensional point cloud structure and mass of the plurality of laser points constituting the three-dimensional point cloud structure, thereby determining a three-dimensional coordinate of the centroid in the specified three-dimensional coordinate system. The terminal may alternatively determine the centroid of the three-dimensional point cloud structure and the three-dimensional coordinate of the centroid, according to another method, which is not specifically limited in the embodiment of this application.

The specified three-dimensional coordinate system may be a space rectangular coordinate system, a spherical coordinate system, and so on, which is not specifically limited in the embodiment of this application.

In addition, the fitted plane equation determined by the terminal may be $a*x+b*y+c*z+d=0$, and may alternatively be a fitted plane equation in another form, which is not specifically limited in the embodiment of this application.

Coefficients a, b, c, and d in the fitted plane equation are all determined by terminal by using the feature vector and the three-dimensional coordinate of the centroid.

Further, when the terminal performs laser scanning processing on an area including a traffic sign, the area possibly further includes other interfering objects similarly of relatively strong light reflection ability, for example, an advertising board of a glass material, and an interfering structure of the interfering objects possibly brings needless operations to the terminal during subsequent processing, and affects acquiring of sign information. Therefore, before the terminal determines a feature vector of a smallest spatial feature value in each spatial feature value of the three-dimensional point cloud structure, and determines a three-dimensional coordinate of a centroid of the three-dimensional point cloud structure in a specified three-dimensional coordinate system, whether the three-dimensional point cloud structure is an interfering structure may further by determined by using the following steps S(1) to S(3).

S(1): The terminal may further determine a first distribution value, a second distribution value and a curvature value of the three-dimensional point cloud structure, based on each spatial feature value of the three-dimensional point cloud structure. The first distribution value and the second distribution value are used for describing a distribution shape of the three-dimensional point cloud structure in a three-dimensional space, and the curvature value is used for describing planarity of the three-dimensional point cloud structure in the three-dimensional space.

The spatial feature values are each sorted in descending order; a ratio of a maximum spatial feature value to a middle spatial feature value is determined as the first distribution value; a ratio of the spatial feature value ranked middle to a minimum spatial feature value is determined as the second distribution value; and a ratio of the minimum spatial feature value to a total of the spatial feature values is determined as the curvature value.

For example, the terminal sequentially sorts the spatial feature values in descending order. When a sorting result is that the first feature is greater than the second feature value, and the second feature is greater than the third feature value, a ratio of the first feature value to the second feature value is determined as the first distribution, a ratio of the second feature value to the third feature value is determined as the second distribution, and a ratio of the third feature value to a total of the spatial feature values is determined as the curvature value.

When a difference between the first distribution value and the second distribution value is in a difference range, a distribution shape of the three-dimensional point cloud structure in the three-dimensional space is determined as solid distribution; when the first distribution value is less than the second distribution value, and the difference between the first distribution value and the second distribution value is not in the difference range, the distribution shape of the three-dimensional point cloud structure in the three-dimensional space is determined as areal distribution; and when the first distribution value is greater than the second distribution value, and the difference between the first distribution value and the second distribution value is not in the difference range, the distribution shape of the three-dimensional point cloud structure in the three-dimensional space is determined as linear distribution.

The difference range may be set in advance, and the difference range may be 1 to 10, 10 to 20, and so on, which is not specifically limited in the embodiment of this application.

In addition, when the curvature value is smaller, planarity of the three-dimensional point cloud structure in the three-dimensional space is determined better. That is, when the curvature value is 0, the planarity of the three-dimensional point cloud structure in the three-dimensional space is determined best.

S(2): The terminal determines whether the three-dimensional point cloud structure is an interfering structure based on the first distribution value, the second distribution value and the curvature value of the three-dimensional point cloud structure.

Because a traffic sign has a size range, the traffic sign is in areal distribution, and planarity of the traffic sign is relatively good, the terminal may determine whether the three-dimensional point cloud structure is an interfering structure based on the first distribution value, the second distribution value and the curvature value of the three-dimensional point cloud structure. Operations performed by the terminal to determine whether the three-dimensional point cloud structure is an interfering structure, based on the first distribution value, the second distribution value and the curvature value of the three-dimensional point cloud structure may include determining a length, a width and a height of the three-dimensional point cloud structure. If the length of the three-dimensional point cloud structure is not in a specified length range, the width of the three-dimensional point cloud structure is not in a specified width range, the height of the three-dimensional point cloud structure is not in a specified height range, the first distribution value is greater than a first distribution threshold, the second distribution value is less than a second distribution threshold, or the curvature value is greater than a curvature threshold, the three-dimensional point cloud structure is determined as an interfering structure; otherwise, the three-dimensional point cloud structure is determined not as an interfering structure.

The terminal may determine the length, the width and the height of the three-dimensional point cloud structure according to a three-dimensional coordinate of a three-dimensional point cloud structure in a specified three-dimensional coordinate system. The terminal may not only determine in the foregoing manner, but only determine in other manners, which is not specifically limited in the embodiment of this application.

The specified length range refers to a standard measuring whether the length of the three-dimensional point cloud structure satisfies a requirement, and the specified length range may be set in advance, for example, the specified length range may be 20 cm to 50 cm, and so on, which is not specifically limited in the embodiment of this application.

Similarly, the specified width range refers to a standard measuring whether the width of the three-dimensional point cloud structure satisfies a requirement, and the specified width range may be set in advance, for example, the specified width range may be 20 cm to 50 cm, which is not specifically limited in the embodiment of this application.

Similarly, the specified height range refers to a standard measuring whether the height of the three-dimensional point cloud structure satisfies a requirement, and the specified height range may be set in advance, for example, the specified height range may be 20 cm to 50 cm, which is not specifically limited in the embodiment of this application.

In addition, the first distribution threshold refers to a standard measuring whether the first distribution value satisfies a requirement, and the first distribution threshold may be set in advance, for example, the first distribution value may be 2, 5, and so on, which is not specifically limited in the embodiment of this application.

Similarly, the second distribution threshold refers to a standard measuring whether the second distribution value satisfies a requirement, and the second distribution threshold may be set in advance, for example, the second distribution value may be 50, 100, and so on, which is not specifically limited in the embodiment of this application.

In addition, the curvature threshold refers to a standard measuring whether the curvature value satisfies a requirement, and the curvature threshold may be set in advance, for example, the curvature threshold may be 50%, 30%, and so on, which is not specifically limited in the embodiment of this application.

S(3) When the three-dimensional point cloud structure is not an interfering structure, the terminal performs steps of the terminal to determine a feature vector of a smallest spatial feature value in each spatial feature value of the three-dimensional point cloud structure, and determine a three-dimensional coordinate of a centroid of the three-dimensional point cloud structure in a specified three-dimensional coordinate system.

When the three-dimensional point cloud structure is not an interfering structure, that is, the three-dimensional point cloud structure satisfies a requirement of the traffic sign, the three-dimensional point cloud structure may be determined as a three-dimensional structure of the traffic sign, so that the terminal may acquire the fitted plane equation of the traffic sign based on the three-dimensional point cloud structure.

After the terminal acquires the fitted plane equation of the traffic sign, the terminal may continue to perform operations of the following step 104.

In addition, because an interfering structure does not satisfy the requirement of the traffic sign, when the three-dimensional point cloud structure is an interfering structure, the interfering structure may be determined not as a traffic sign. In this case, operations on the three-dimensional point cloud structure may be stopped, and a fitted plane equation of the interfering structure does not need to be acquired, so that operations of acquiring the sign information of the traffic sign in the following step 104 do not need to be performed. Alternatively, the terminal may further get rid of the three-dimensional point cloud structure to avoid the interfering structure to affect operations on another three-dimensional point cloud structure.

Based on the foregoing descriptions, the terminal may not only include a vehicle-mounted mobile measurement system 11, but also may include a processor. Therefore, when the terminal acquires a plurality of laser points of the traffic sign by laser scanning processing, the terminal may perform the operations according to the foregoing step 102 and step 103 on the laser points of the traffic sign by using the processor.

Step 104: the terminal acquires the sign information of the traffic sign based on the image of the traffic sign, the three-dimensional point cloud structure, and the fitted plane equation.

The terminal may project the three-dimensional point cloud structure to the image of the traffic sign by using a preset exterior orientation element, the exterior orientation element including a spatial position and a posture parameter of a main beam when the image is acquired; determine an image area occupied by the three-dimensional point cloud structure on the image; project a coordinate of each pixel point in the image area in a specified plane coordinate system to the three-dimensional space by using the fitted plane equation, to obtain image data of the traffic sign; correct the video data of the traffic sign to eliminate image obliquity of the image data; and perform image recognition on the corrected image data of the traffic sign to obtain the sign information of the traffic sign.

The terminal may project the three-dimensional point cloud structure to a position corresponding to the three-dimensional point cloud structure in the image of the traffic sign by using the preset exterior orientation element.

The exterior orientation element is basic data to determine a geometrical relationship of a main beam of photographing in an area including a traffic sign, and is used for representing a spatial position and a spatial posture of the main beam of photographing in a photographing moment. The spatial position included by the exterior orientation element is mainly three straight line elements, used for indicating a coordinate position of the main beam in the area including the traffic sign, and the posture parameter is mainly three angle elements, used for expressing a spatial posture in the image.

The specified plane coordinate system may be a plane coordinate system established in the image of the traffic sign, and the specified plane coordinate system may be a rectangular plane coordinate system, a polar coordinate system, and so on, which is not specifically limited in the embodiment of this application.

In addition, because when the terminal obtains the image data of the traffic sign, the image data of the traffic sign possibly has image obliquity when imaging, and inaccurate sign information is possibly acquired by performing image recognition on the image data having image obliquity, the terminal corrects the image data of the traffic sign when obtaining the image data of the traffic sign.

Operations performed by the terminal to correct the image data of the traffic sign may include determining obliquity of the image data relative to a plane where any two coordinate axes in the specified three-dimensional coordinate system are located, projecting the image data to the a plane where any two coordinate axes in the specified three-dimensional coordinate system, or a plane parallel to the plane, in a obliquity direction, and determining the projected projection data as corrected affecting data.

The terminal may correct the image data of the traffic sign by using the foregoing method, and may alternatively correct by using another method, which is not specifically limited in the embodiment of this application.

In addition, the terminal may perform image recognition on the corrected traffic sign by using a recognition method based on a color, a shape and a sift (scale_invariant feature transform) feature, or a recognition method based on an HOG (Histogram of Oriented Gradient) or a texture, or a recognition method based on deep learning, which is not specifically limited in the embodiment of this application.

Based on the foregoing descriptions, the vehicle-mounted mobile measurement system 11 of FIG. 1A included by the terminal 1 may not only include the laser scanning system 111 and the video imaging system 112, but only may include an integrated navigation system. Therefore, when the terminal acquires the sign information of the traffic sign, the sign information may be added into the high-precision map by using the integrated navigation system, to implement application of the sign information of the traffic sign.

In the embodiment of this application, the terminal may perform laser scanning processing on the area including the traffic sign, to obtain a plurality of area points and traffic signs. Because the traffic sign has a feature of relatively strong reflection intensity to light, the terminal may determine a plurality of laser points of the traffic sign and point cloud data of the plurality of laser points in a plurality of areas by using the feature. In addition, because a laser is an active light source, when a laser scanning processing is performed on an area including the traffic sign, the illumination impact may be avoided, thereby improving accuracy of subsequently acquiring the sign information. Then, the terminal may perform spatial clustering on the plurality of laser points according to the point cloud data of the plurality of laser points to obtain a three-dimensional point cloud structure of the traffic sign, determine a spatial distribution feature of the three-dimensional point cloud structure, and determine whether the three-dimensional point cloud structure is an interfering structure according to the spatial distribution feature, thereby getting rid of some interfering structures, and reducing subsequent operation burden of the terminal. In addition, when the three-dimensional point cloud structure is not an interfering structure, a fitted plane equation of the traffic sign may be determined, and operations such as image recognition may be performed on the image data based on the image of the traffic sign, the three-dimensional point cloud structure and the fitted plane equation to acquire sign information of the traffic sign. Because the point cloud data of the plurality of laser points may accurately express a coordinate of the three-dimensional point cloud structure in a specified three-dimensional system, a series of operations of the terminal performed based on the accurate coordinate are all accurate operations. This reduces an error of acquiring the sign information, thereby improving accuracy, efficiency and robustness of acquiring the sign information of the traffic sign.

Figure 2A:
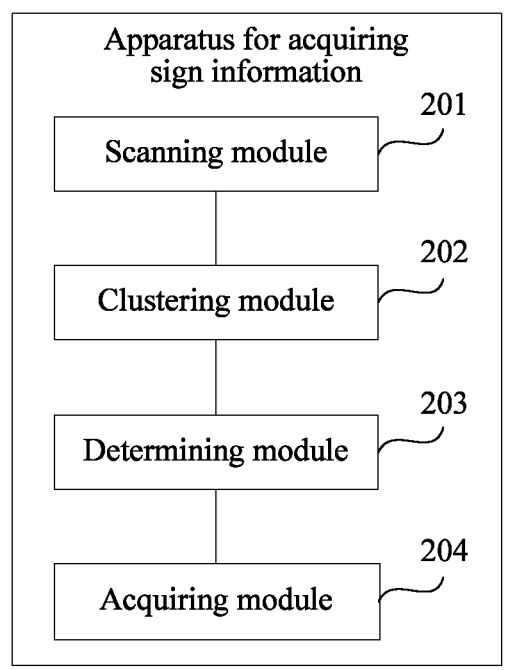
FIG. 2A is a schematic structural diagram of an apparatus for acquiring sign information according to embodiments.

FIG. 2A is a schematic structural diagram of an apparatus 200 for acquiring sign information according to embodiments. Referring to FIG. 2A, the apparatus 200 includes a scanning module 201, a clustering module 202, a determining module 203, and an acquiring module 204.

The scanning module 201 is configured to perform laser scanning processing on an area including a traffic sign, to obtain an image of the traffic sign, a plurality of laser points of the traffic sign and point cloud data of the plurality of laser points, and point cloud data of each laser point is used for describing each laser point.

The clustering module 202 is configured to perform spatial clustering on the plurality of laser points to obtain a three-dimensional point cloud structure of the traffic sign based on the point cloud data of the plurality of laser points.

The determining module 203 is configured to determine a fitted plane equation of the traffic sign, based on the three-dimensional point cloud structure.

The acquiring module 204 is configured to acquire the sign information of the traffic sign, based on the image of the traffic sign, the three-dimensional point cloud structure, and the fitted plane equation.

Figure 2B:
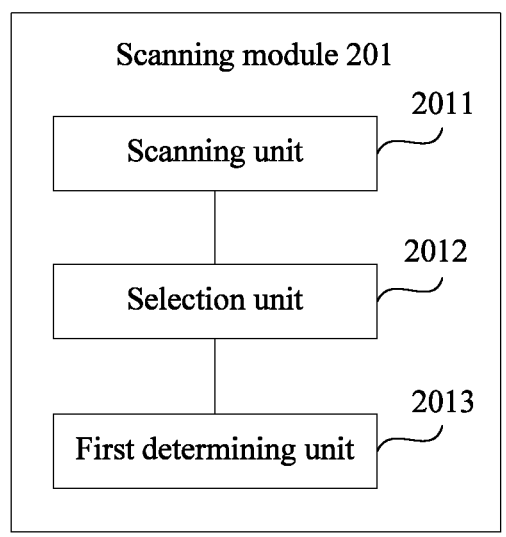
FIG. 2B is a schematic structural diagram of a scanning module according to embodiments.

FIG. 2B is a schematic structural diagram of the scanning module 201 according to embodiments. Optionally, referring to FIG. 2B, the scanning module 201 includes a scanning unit 2011, a selection unit 2012 and a first determining unit 2013.

The scanning unit 2011 is configured to perform laser scanning processing on an area including a traffic sign, to obtain an image of the traffic sign, a plurality of area points and point cloud data of the plurality of area points, point cloud data of each area point including a reflectivity value of each area point.

The selection unit 2022 is configured to select a plurality of area points whose reflectivity values are greater than or equal to a reflectivity threshold, from the plurality of area points.

The first determining unit 2013 is configured to determine the plurality of selected area points as a plurality of laser points of the traffic sign, and determine point cloud data of the plurality of selected area points as point cloud data of the plurality of laser points.

Figure 2C:
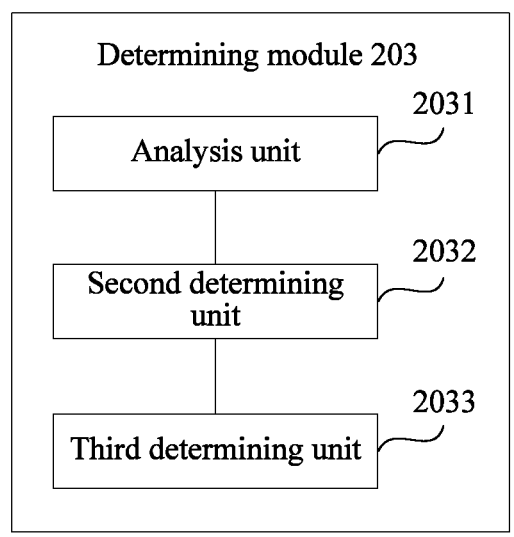
FIG. 2C is a schematic structural diagram of a determining module according to embodiments.

FIG. 2C is a schematic structural diagram of the determining module 203 according to embodiments. Optionally, referring to FIG. 2C, the determining module 203 includes an analysis unit 2031, a second determining unit 2032 and a third determining unit 2033.

The analysis unit 2031 is configured to perform a principal component analysis on the three-dimensional point cloud structure to obtain each spatial feature value of the three-dimensional point cloud structure.

The second determining unit 2032 is configured to determine a feature vector of a smallest spatial feature value in each spatial feature value of the three-dimensional point cloud structure, and determine a three-dimensional coordinate of a centroid of the three-dimensional point cloud structure in a specified three-dimensional coordinate system.

The third determining unit 2033 is configured to determine a fitted plane equation of the traffic sign based on the feature vector and the three-dimensional coordinate of the centroid of the three-dimensional point cloud structure in the specified three-dimensional coordinate system.

Figure 2D:
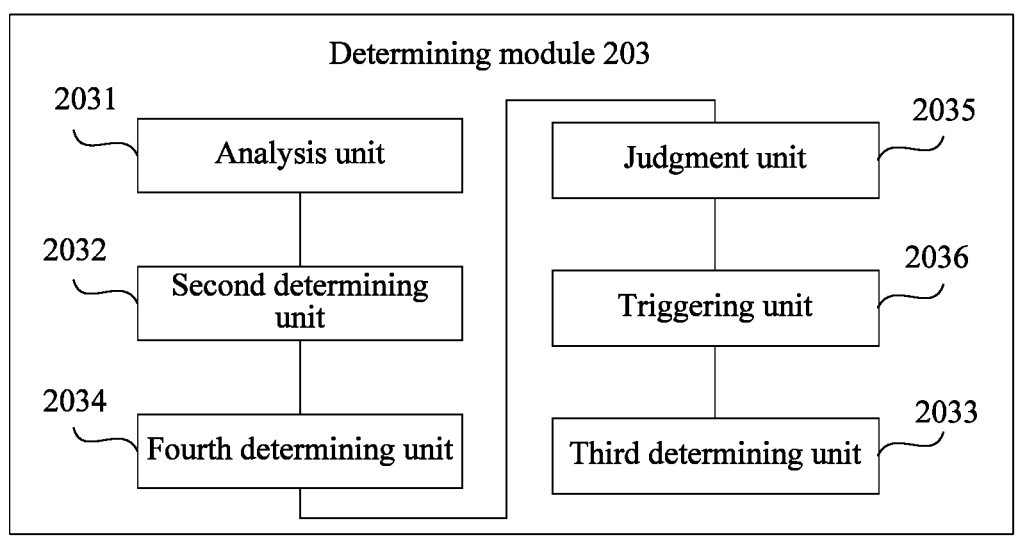
FIG. 2D is a schematic structural diagram of another determining module according to embodiments.

FIG. 2D is a schematic structural diagram of the determining module 203 according to embodiments. Optionally, referring to FIG. 2D, the determining module 203 further includes a fourth determining unit 2034, a judgement unit 2035 and a triggering unit 2036.

The fourth determining unit 2034 is configured to determine a first distribution value, a second distribution value and a curvature value of the three-dimensional point cloud structure based on each spatial feature value of the three-dimensional point cloud structure, the first distribution value and the second distribution value being used for describing a distribution shape of the three-dimensional point cloud structure in a three-dimensional space, and the curvature value being used for describing planarity of the three-dimensional point cloud structure in the three-dimensional space.

The judgment unit 2035 is configured to determine whether the three-dimensional point cloud structure is an interfering structure based on the first distribution value, the second distribution value and the curvature value of the three-dimensional point cloud structure.

The triggering unit 2036 is configured to trigger, when the three-dimensional point cloud structure is not an interfering structure, the second determining unit to determine a feature vector of a smallest spatial feature value in each spatial feature value of the three-dimensional point cloud structure, and determine a three-dimensional coordinate of a centroid of the three-dimensional point cloud structure in a specified three-dimensional coordinate system.

Figure 2E:
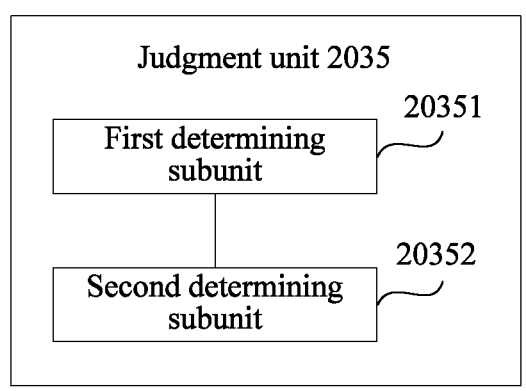
FIG. 2E is a schematic structural diagram of a judgment unit according to embodiments.

FIG. 2E is a schematic structural diagram of the judgment unit 2035 according to embodiments. Optionally, referring to FIG. 2E, the judgment unit 2035 includes a first determining subunit 20351 and a second determining subunit 20352.

The first determining subunit 20351 is configured to determining a length, a width and a height of the three-dimensional point cloud structure.

The second determining subunit 20352 is configured to determine, if the length of the three-dimensional point cloud structure is not in a specified length range, the width of the three-dimensional point cloud structure is not in a specified width range, the height of the three-dimensional point cloud structure is not in a specified height range, the first distribution value is greater than a first distribution threshold, the second distribution value is less than a second distribution threshold, or the curvature value is greater than a curvature threshold, the three-dimensional point cloud structure as an interfering structure, and otherwise determine the three-dimensional point cloud structure not as an interfering structure.

Figure 2F:
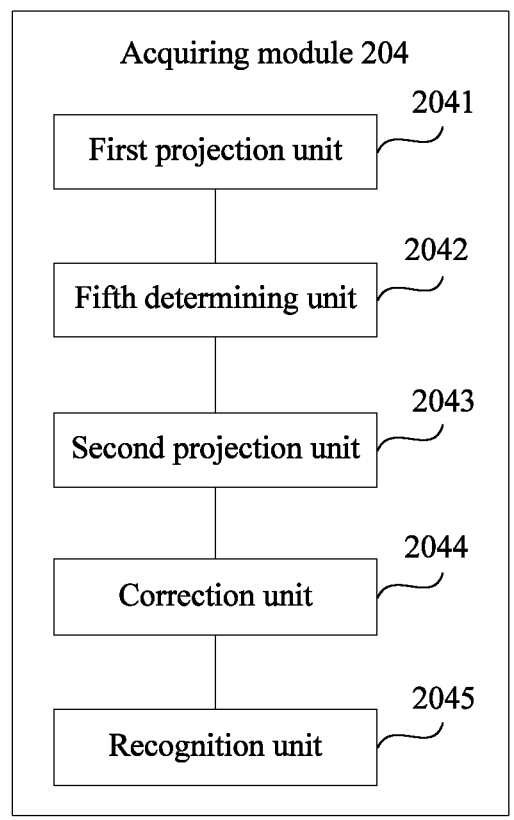
FIG. 2F is a schematic structural diagram of an acquiring module according to embodiments.

FIG. 2F is a schematic structural diagram of the acquiring module 204 according to embodiments. Optionally, referring to FIG. 2F, the acquiring module 204 includes a first projection unit 2041, a fifth determining unit 2042, a second projection unit 2043, a correction unit 2044 and a recognition unit 2045.

The first projection unit 2041 is configured to project the three-dimensional point cloud structure to the image of the traffic sign by using a preset exterior orientation element, the exterior orientation element including a spatial position and a posture parameter of a main beam when the image is acquired.

The fifth determining unit 2042 is configured to determine an image area occupied by the three-dimensional point cloud structure on the image.

The second projection unit 2043 is configured to project a coordinate of each pixel point in the image area in a specified plane coordinate system to the three-dimensional space by using the fitted plane equation, to obtain image data of the traffic sign.

The correction unit 2044 is configured to correct the video data of the traffic sign to eliminate image obliquity of the image data.

The recognition unit 2045 is configured to perform image recognition on the corrected image data of the traffic sign to obtain the sign information of the traffic sign.

In the embodiment of this application, the terminal may perform laser scanning processing on the area including the traffic sign, to obtain a plurality of area points and traffic signs. Because the traffic sign has a feature of relatively strong reflection intensity to light, the terminal may determine a plurality of laser points of the traffic sign and point cloud data of the plurality of laser points in a plurality of areas by using the feature. In addition, because a laser is an active light source, when a laser scanning processing is performed on an area including the traffic sign, the illumination impact may be avoided, thereby improving accuracy of subsequently acquiring the sign information. Then, the terminal may perform spatial clustering on the plurality of laser points according to the point cloud data of the plurality of laser points to obtain a three-dimensional point cloud structure of the traffic sign, determine a spatial distribution feature of the three-dimensional point cloud structure, and determine whether the three-dimensional point cloud structure is an interfering structure according to the spatial distribution feature, thereby getting rid of some interfering structures, and reducing subsequent operation burden of the terminal. In addition, when the three-dimensional point cloud structure is not an interfering structure, a fitted plane equation of the traffic sign may be determined, and operations such as image recognition may be performed on the image data based on the image of the traffic sign, the three-dimensional point cloud structure and the fitted plane equation to acquire sign information of the traffic sign. Because the point cloud data of the plurality of laser points may accurately express a coordinate of the three-dimensional point cloud structure in a specified three-dimensional system, a series of operations of the terminal performed based on the accurate coordinate are all accurate operations. This reduces an error of acquiring the sign information, thereby improving accuracy, efficiency and robustness of acquiring the sign information of the traffic sign.

When the apparatus 200 for acquiring sign information provided in the foregoing embodiment acquires sign information, it is illustrated with an example of division of each function module. In the practical application, the function distribution may be finished by different function modules according to the requirements, that is, divide the internal structure of the equipment into different function modules, to finish all or part of the functions described. Besides, the apparatus 200 for acquiring sign information provided in the foregoing embodiment and the embodiments of the method for acquiring sign information belong to one concept. For the implementing procedure, refer to the method embodiment, and no further details are provided herein.

Figure 3:
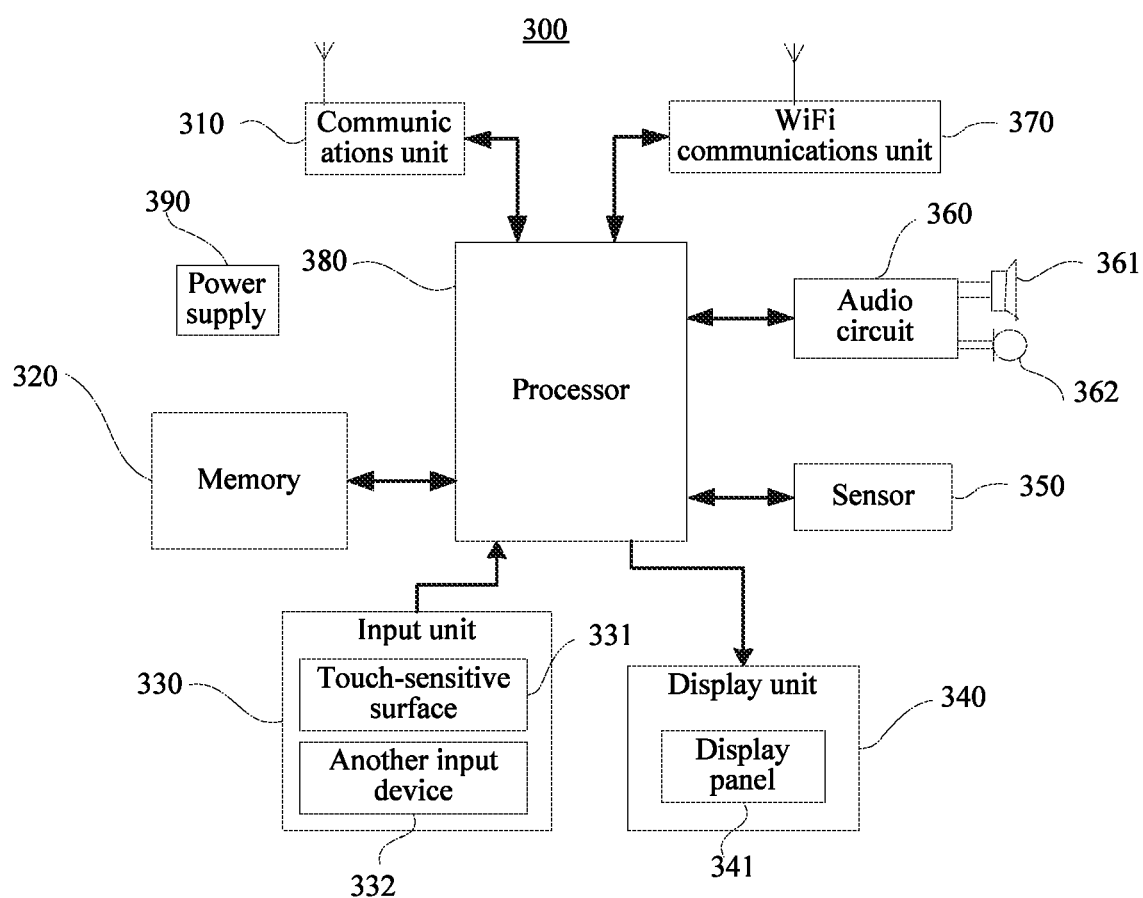
FIG. 3 is a schematic structural diagram of an apparatus for acquiring sign information according to embodiments.

FIG. 3 is a schematic structural diagram of an apparatus for acquiring sign information according to embodiments. Referring to FIG. 3, a terminal 300 may include a communications interface 310, a memory 320 including one or more computer readable storage media, an input interface 330 including a touch-sensitive surface 331 and another input device 332, a display 340 including a display panel 341, a sensor 350, an audio circuit 360 including a speaker 361 and a microphone 362, a WiFi (Wireless Fidelity) communications interface 370, a processor 380 including one or more processing cores, a power supply 390, and the like. A person skilled in the art may understand that the structure of the terminal 300 shown in FIG. 3 does not constitute a limitation to the terminal 300, and the terminal 300 may include more components or fewer components than those shown in the figure, some components may be combined, or a different component deployment may be used. In this embodiment, the terminal 300 further includes one or more programs, in which the one or more programs are stored in a memory, and are configured to be executed by one or more processors, and the one or more programs include an instruction used for performing the method for acquiring sign information as shown in FIG. 1B provided in the embodiments of this application.

A person of ordinary skill in the art may understand that all or some of the steps of the foregoing embodiments may be implemented by using hardware, or may be implemented by a program instructing relevant hardware. The program may be stored in a non-transitory computer-readable storage medium. The storage medium may be a read-only memory, a magnetic disk, an optical disc, or the like.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The foregoing descriptions are embodiments of this application, but are not intended to limit this application. Any modification, equivalent replacement, or improvement made within the spirit and principle of this application shall fall within the protection scope of this application.

What is claimed is:

1. A method for acquiring traffic sign information, the method being performed by a data processing device, and the method comprising:
    acquiring an image of a scene comprising a traffic sign, the image being obtained by photographing the scene, using a photographing apparatus;
    acquiring first laser data of the scene, the first laser data being obtained by performing laser scanning on the scene, and the first laser data being of a plurality of first laser points;
    performing spatial clustering on the plurality of first laser points to obtain candidate point sets;
    acquiring a spatial distribution feature of respective laser points in each of the candidate point sets;
    determining at least one point set corresponding to the traffic sign in the candidate point sets, based on the spatial distribution feature;
    extracting image data of the traffic sign, from the image, using the at least one point set corresponding to the traffic sign;
    determining a fitted plane equation of the traffic sign, using the at least one point set corresponding to the traffic sign;
    correcting the image data of the traffic sign, using the fitted plane equation, to eliminate an imaging inclined angle of the image data; and
    performing image recognition on the corrected image data to extract sign information of the traffic sign.

2. The method according to claim 1, wherein the acquiring the first laser data comprises:
    acquiring second laser data of the scene, the second laser data being obtained by performing the laser scanning on the scene, the second laser data being of a plurality of second laser points, and the second laser data comprising a reflection characteristic value of each of the plurality of second laser points; and
    generating the first laser data to include pieces of the second laser data, each of which comprises the reflection characteristic value greater than or equal to a preset threshold.

3. The method according to claim 1, wherein the performing the spatial clustering comprises grouping the plurality of first laser points, using a preset distance threshold, to obtain the candidate point sets, a spatial distance between laser points respectively in the candidate point sets being greater than the preset distance threshold.

4. The method according to claim 1, wherein the acquiring the spatial distribution feature comprises acquiring spatial distribution feature values of the respective laser points in each of the candidate point sets, in dimensions, and the determining the at least one point set corresponding to the traffic sign comprises selecting the at least one candidate point set corresponding to the traffic sign, from the candidate point sets, using preset spatial distribution feature thresholds and the spatial distribution feature values of each of the candidate point sets.

5. The method according to claim 4, wherein each of the spatial distribution feature values is one of a distribution feature value in length, a distribution feature value in width, a distribution feature value in height, a linear distribution feature value, an areal distribution feature value, a solid distribution feature value, a curvature, and a fitted plane feature value, and the preset spatial distribution feature thresholds are determined according to a size range and a shape feature of the traffic sign.

6. The method according to claim 1, where the extracting the image data of the traffic sign comprises:

acquiring a conversion parameter, the conversion parameter being used for performing coordinate conversion between the plurality of first laser points and the image of the scene;

determining a position of the image data of the traffic sign in the image, based on the conversion parameter and the at least one point set corresponding to the traffic sign; and extracting the image data of the traffic sign, from the position in the image.

7. An apparatus for acquiring traffic sign information, the apparatus comprising:

at least one memory configured to store computer program code; and at least one processor configured to access the at least one memory and operate according to the computer program code, the computer program code comprising:

scanning code configured to cause the at least one processor to:

acquire an image of a scene comprising a traffic sign, the image being obtained by photographing the scene, using a photographing apparatus; and acquire first laser data of the scene, the first laser data being obtained by performing laser scanning on the scene, and the first laser data being of a plurality of first laser points;

clustering code configured to cause the at least one processor to perform spatial clustering on the plurality of first laser points to obtain candidate point sets;

determining code configured to cause the at least one processor to:

acquire a spatial distribution feature of respective laser points in each of the candidate point sets; and determine at least one point set corresponding to the traffic sign in the candidate point sets, based on the spatial distribution feature; and acquiring code configured to cause the at least one processor to:

extract image data of the traffic sign, from the image, using the at least one point set corresponding to the traffic sign;

determine a fitted plane equation of the traffic sign, using the at least one point set corresponding to the traffic sign;

correct the image data of the traffic sign, using the fitted plane equation, to eliminate an imaging inclined angle of the image data; and perform image recognition on the corrected image data to extract sign information of the traffic sign.

8. The apparatus according to claim 7, wherein the scanning code is further configured to cause the at least one processor to:

acquire second laser data of the scene, the second laser data being obtained by performing the laser scanning on the scene, the second laser data being of a plurality of second laser points, and the second laser data comprising a reflection characteristic value of each of the plurality of second laser points; and generate the first laser data to include pieces of the second laser data, each of which comprises the reflection characteristic value greater than or equal to a preset threshold.

9. The apparatus according to claim 7, wherein the clustering code is further configured to cause the at least one processor to group the plurality of first laser points, using a preset distance threshold, to obtain the candidate point sets, a spatial distance between laser points respectively in the candidate point sets being greater than the preset distance threshold.

10. The apparatus according to claim 7, wherein the determining code is further configured to cause the at least one processor to:

acquire spatial distribution feature values of the respective laser points in each of the candidate point sets, in dimensions; and select the at least one candidate point set corresponding to the traffic sign, from the candidate point sets, using preset spatial distribution feature thresholds and the spatial distribution feature values of each of the candidate point sets.

11. The apparatus according to claim 7, wherein the acquiring code is further configured to cause the at least one processor to:

acquire a conversion parameter, the conversion parameter being used for performing coordinate conversion between the plurality of first laser points and the image of the scene;

determine a position of the image data of the traffic sign in the image, based on the conversion parameter and the at least one point set corresponding to the traffic sign; and extract the image data of the traffic sign, from the position in the image.

12. A non-transitory computer-readable storage medium storing instructions that cause a processor to:

acquire an image of a scene comprising a traffic sign, the image being obtained by photographing the scene, using a photographing apparatus;

acquire first laser data of the scene, the first laser data being obtained by performing laser scanning on the scene, and the first laser data being of a plurality of first laser points;

perform spatial clustering on the plurality of first laser points to obtain candidate point sets;

acquire a spatial distribution feature of respective laser points in each of the candidate point sets;

determine at least one point set corresponding to the traffic sign in the candidate point sets, based on the spatial distribution feature;

extract image data of the traffic sign, from the image, using the at least one point set corresponding to the traffic sign;

determine a fitted plane equation of the traffic sign, using the at least one point set corresponding to the traffic sign;

correct the image data of the traffic sign, using the fitted plane equation, to eliminate an imaging inclined angle of the image data; and perform image recognition on the corrected image data to extract sign information of the traffic sign.

13. The non-transitory computer-readable storage medium according to claim 12, wherein the instructions further cause the processor to group the plurality of first laser points, using a preset distance threshold, to obtain the candidate point sets, a spatial distance between laser points respectively in the candidate point sets being greater than the preset distance threshold.

14. The non-transitory computer-readable storage medium according to claim 12, wherein the instructions further cause the processor to:

acquire spatial distribution feature values of the respective laser points in each of the candidate point sets, in dimensions; and select the at least one candidate point set corresponding to the traffic sign, from the candidate point sets, using preset spatial distribution feature thresholds and the spatial distribution feature values of each of the candidate point sets.

15. The non-transitory computer-readable storage medium according to claim 12, wherein the instructions further cause the processor to:

acquire a conversion parameter, the conversion parameter being used for performing coordinate conversion between the plurality of first laser points and the image of the scene;

determine a position of the image data of the traffic sign in the image, based on the conversion parameter and the at least one point set corresponding to the traffic sign; and extract the image data of the traffic sign, from the position in the image.

* * * * *